United States Patent [19]
Thompson et al.

[11] Patent Number: 5,530,580
[45] Date of Patent: Jun. 25, 1996

[54] ELECTRO ABSORPTION OPTICAL MODULATORS

[75] Inventors: George H. B. Thompson, Sawbridgeworth; Igor K. Czajknwski; Mark A. Gibbon, both of Bishop's Stortford, all of United Kingdom

[73] Assignee: Northern Telecom Limited, Montreal, Canada

[21] Appl. No.: 303,374

[22] Filed: Sep. 9, 1994

[30] Foreign Application Priority Data

Sep. 9, 1993 [GB] United Kingdom .................... 9318666

[51] Int. Cl.$^6$ .................................................. G02F 1/03
[52] U.S. Cl. .................................................. 359/248
[58] Field of Search .................. 359/244, 260, 359/276, 248; 372/45, 46; 385/17; 257/18

[56] References Cited

U.S. PATENT DOCUMENTS 5,012,304  4/1991  Kash et al. .................... 357/7

FOREIGN PATENT DOCUMENTS 0400559  12/1990  European Pat. Off. ..
0420749  4/1991  European Pat. Off. ..

OTHER PUBLICATIONS

Takasaki et al., "Observation of separate electron and hole escape rates in unbiased strained InGaAsP multiple quantum well laser structures", Applied Physics Letters, vol. 62, No. 20, May 17, 1993, pp. 2525–2527.

Primary Examiner—Georgia Y. Epps
Assistant Examiner—Dawn-Marie Bey
Attorney, Agent, or Firm—Lee, Mann, Smith, McWilliams, Sweeney & Ohlson

[57] ABSTRACT

The saturation effects observed in an MQW electro-absorption modulator are reduced by modifying the composition of the MQW structure so that the barrier layers, that are interleaved with the quantum well layers, are in tension.

12 Claims, 2 Drawing Sheets

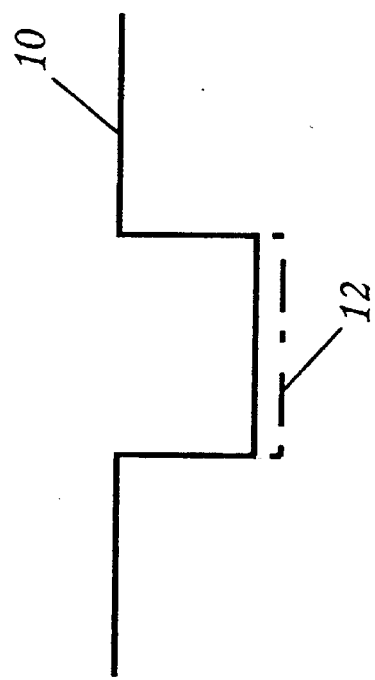
Fig. 1.
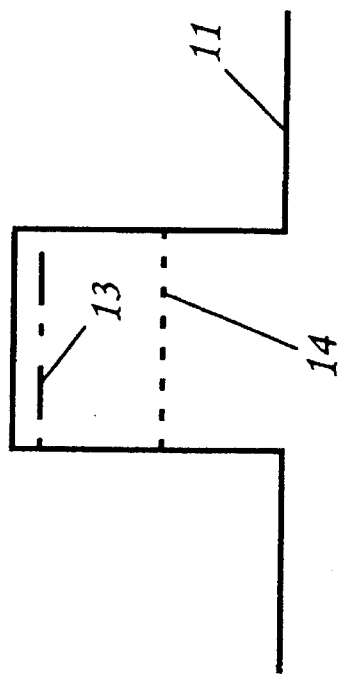
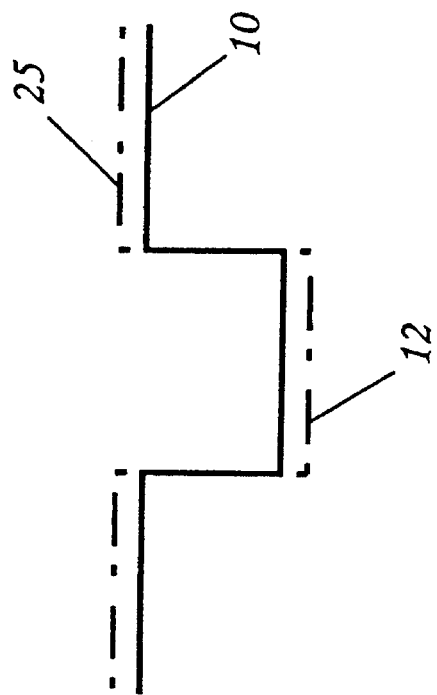
Fig. 2.
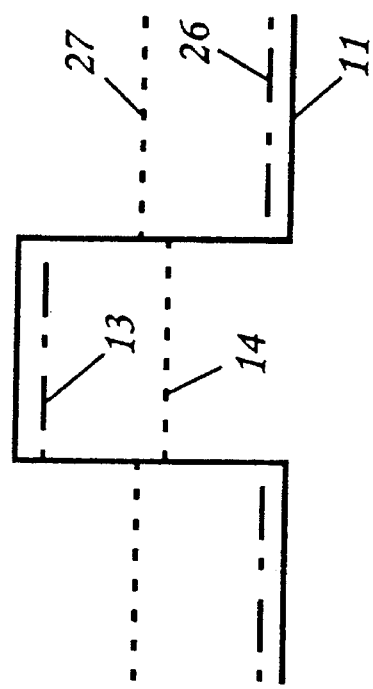

ELECTRO ABSORPTION OPTICAL MODULATORS

BACKGROUND TO THE INVENTION

This invention relates to electro-absorption optical modulators, particularly to the type of such modulator that incorporate reverse-biased multiquantum well (MQW) structures, and is concerned with saturation effects liable to occur in such modulators.

For the purposes of this specification, a distinction is drawn between a multi-quantum well (MQW) structure of interleaved quantum well layers and barrier layers, and a superlattice structure, similarly of interleaved quantum well layers and barrier layers. This distinction is that, in an MQW structure, the barrier layers are thick enough to preclude any substantial band structure interaction between adjacent quantum well layers; whereas, in a superlattice structure, the barrier layers are specifically and deliberately thin enough to provide interaction sufficient to produce a mini-band structure.

Saturation effects observed in MQW electro-absorption modulators result from the slow escape of photon-generated carriers from the reverse-biased quantum wells. It is believed that these effects are liable to be more pronounced in semiconductor systems, such as InGaAsP/InP and InGaAs/Inp systems, in which the valence band steps on both sides of the quantum well layers are significantly larger than the corresponding conduction band steps. A paper by B W Takasawi et al, entitled "Observation of Separate Electron and Hole Escape Rates in Unbiased Strained InGaAsP Multiple Quantum Well Laser Structures", Applied Physics Letters, 62 (20), 17 May 1993 pp 2525-7, describes measurements made to assess the escape times of photo-generated electrons and holes generated in a multiquantum well structure comprising quantum wells made of InGaAsP interleaved with barrier layers made of InP. The analysis shows that, in this InGaAsP/InP semiconductor system, the hole escape times are significantly longer than the corresponding electron escape times, but that the hole escape times can be reduced from about 18 ns, in the case of examples with unstrained quantum wells, to about 10 ns in the case of examples where the quantum well composition is chosen to put the quantum wells in 1.2% compression, and to about 13 ns in the case of examples where the quantum well composition is instead chosen to put the quantum wells in tension. These reductions in hole escape times, which are attributed to thermally assisted tunnelling effects via higher energy levels (a light hole in the case of compressively strained quantum wells, and a heavy hole in the case of those that are in tensile strain), will clearly have an effect in ameliorating saturation problems to some extent, but still leaves a hole escape time that is inconveniently long for many applications.

SUMMARY OF THE INVENTION

The present invention is directed to obtaining a significant further reduction in hole escape times.

According to the present invention there is provided an electro-absorption optical modulator having a substrate of a first composition material supporting a set of epitaxially grown layers defining a p-i-n architecture that includes a multiquantum well structure comprising a plurality of quantum well layers of a second composition material, which quantum well layers are interleaved with barrier layers of a third composition material, wherein the barrier layers are thick enough to preclude any substantial band structure interaction between adjacent quantum well layers, and wherein the third composition material has a smaller unstrained lattice constant than that of the first composition material, whereby the barrier layers are put in tensile strain.

BRIEF DESCRIPTION OF THE DRAWINGS

There follows a description of an electro-absorption modulator embodying the present invention in a preferred form. This description is prefaced with an explanation of a suggested reason for the reduction in hole escape times afforded by the structure. The description refers to the accompanying drawings, in which:

FIGS. 1 and 2 are band structure diagrams, and

DETAILED DESCRIPTION OF A PREFERRED EMBODIMENT

Figure 3:
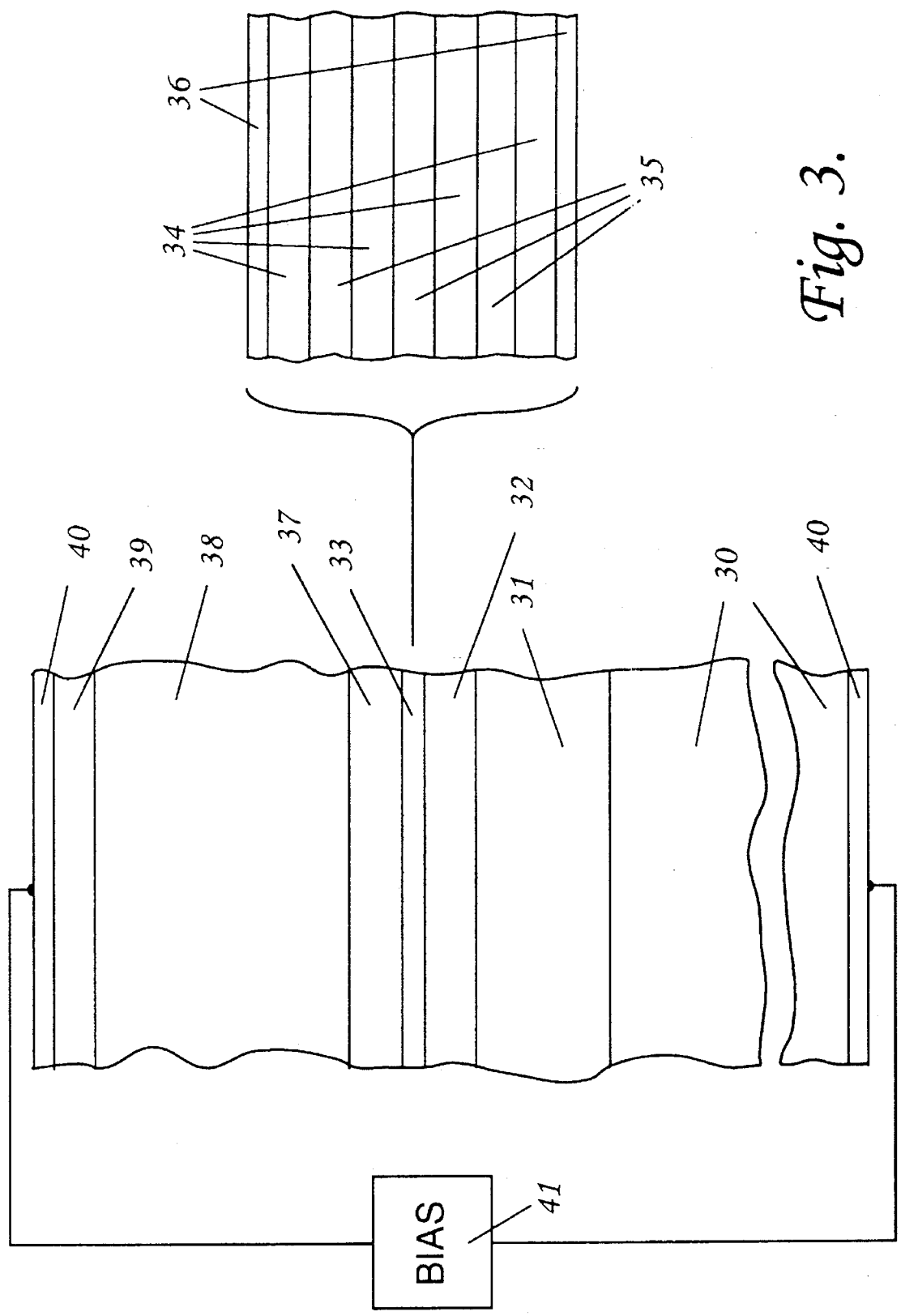
FIG. 3 is a schematic cross-section of the electro-absorption modulator depicting its layer structure.

FIG. 1 depicts the band structure of a single quantum well, where the solid line 10 depicts the conduction band, showing the electron energy discontinuities at the boundaries of the quantum well, while the solid line 11 depicts the valence band, showing the hole energy discontinuities at these boundaries. The vertical separation between solid lines 10 and 11 indicates the bandgap, this being less in the quantum well than in the barrier layer material that lies on either side of the quantum well. The energy discontinuities in the conduction band are represented as being significantly smaller than those in the valence band, which is the situation that pertains for instance in a strain-free InGaAsP/InP quantum well structure where the wells are made of InGaAsP and the barrier layers are made of InP. It is this disparity in energy discontinuities between the conduction and valence bands in conjunction with the significant energy of the confined electron that is responsible for the large difference between electron escape times, which are relatively rapid, and hole escape times.

If the material of the quantum well is replaced with the same thickness of a different composition having a different unstrained lattice constant but the same bandgap, the band structure changes. In particular, if the new quantum well material has a larger unstrained lattice constant that puts the quantum well layer in compressive strain, the discontinuities in the conduction band increases somewhat as a result of a deepening of the electron well as represented by the chain-dotted line 12. Because the bandgap of the new quantum well material is the same as that of the original quantum well material, there is a complementary change in the discontinuities in the valence band, making the deepest band edge in this inverted well shallower by an equivalent amount, as depicted by the chain-dotted line 13. This deepest band edge is the band edge of heavy holes; light holes being at a somewhat shallower level represented by the broken line 14. (The heavy hole and light hole band edges are at the same energy in unstrained material).

If, on the other hand, the new quantum well material had had a smaller unstrained lattice constant resulting in the quantum well being put in tensile strain (instead of compressive strain), and the composition had also been chosen to maintain approximately the conduction-band-to-heavy-hole bandgap, the electron well in the conduction band would have been made somewhat shallower (not shown); the well in the valence band for heavy holes would have been made deeper by an equivalent amount (not shown), thereby maintaining the same bandgap; and the corresponding well in the valence band for light holes would have been deepened by a considerably greater amount (not shown). These changes are not illustrated in FIG. 1, which only compares the unstrained band structure with that pertaining when the quantum well material is compressively strained, the quantum well layer in both instances being confined between unstrained barrier layers. Equivalent results are however depicted in the band structure of FIG. 2, as this compares the unstrained band structure, given by lines 10 and 11, with that pertaining when the quantum well material is compressively strained while the barrier layer material is in tensile strain. In this instance the new quantum well material is the same new quantum well material as that of FIG. 1, while the new barrier layer material is of different composition having a smaller unstrained lattice constant than that of the original barrier layer material so that the new material is in tensile strain. The composition is also chosen to maintain approximately the conduction-band-to-heavy-hole bandgap. The result of this tensile strain has been to increase the conduction band discontinuities as represented by the chain dotted line 25; to reduce the valence band discontinuities for heavy holes by an approximately equal amount, as represented by chain-dotted line 26; and to reduce the valence band discontinuities in respect of light holes by a greater amount, as depicted by broken line 27. As compared with the energy level discontinuity in the valence band of unstrained material as represented by line 11, the relative close proximity between the energy level 13 of heavy holes in the compressivly strained quantum well material and the energy level 27 of light holes in the tensile strained barrier layer material means that photo-generated holes created in the quantum layer material are able to escape into the barrier layer material, by conversion from heavy holes to light holes, much more readily than in the corresponding unstrained structure (for which conversion is not necessary).

With reference to FIG. 2, it may be noted that the light hole energy level has been represented as being at a deeper level in the barrier layer material than in the quantum well material, but this should not be understood as indicative that this is the relationship that will necessarily pertain in practice.

It may also be noted that in the field of laser diodes it is known to have MQW structure in which the quantum wells are in compressive strain while the barrier layers with which they are interleaved are in tensile strain. In such lasers the amount of tensile strain in the barrier layers is typically quite small in comparison with the amount of compressive strain in the quantum wells. This is because the tensile strain is provided in the barrier layers to compensate the compressive strain in the quantum wells. The barrier layers are designed to be significantly thicker than the quantum well layers so that the balance is achieved at a correspondingly lower strain in the barrier layers, which facilitates growth of the material. This contrasts with the situation in the present instance relating to electro-absorption modulator, where the tensile strain is not incorporated into the barrier layers for the purpose of strain compensation, but is instead employed for its effect in usefully modifying the band structure. The tensile strain in this instance is higher than is typical in strained MQW lasers typically being at least 0.5%, generally greater than 0.8%, and preferably about 1.0% if growth conditions allow.

Referring now to FIG. 3, one particular embodiment of the invention is illustrated in cross section. The necessary layer structure is grown epitaxially on an n-type InP substrate 30 which is n-doped with sulphur to a concentration of around $10^{18}$ cm$^{-3}$. On top of this is grown an n-type buffer layer 31 doped to $5\times10^{17}$ cm$^{-3}$ and about 0.5 µm thick. This is followed by a 0.2 µm thick layer 32 of undoped lattice-matched InGaAsP, of a composition to give a bandgap of about 1.05 eV, which forms the lower half of the waveguide. The undoped MQW structure, 33 is next grown, comprising four or so 8 nm thick InGaAsP quantum wells 34 of a composition to give about 0.78 eV bandgap, depending on the required wavelength of operation, with 1% compressive strain, separated by 8 nm thick barrier layers 35 of a composition to give about 1.0 eV electron-to-light-hole bandgap, with 1% tensile strain, and enclosed by two further 4 nm thick layers 36 of the same material. A second waveguide layer 37, identical with the first is then grown, followed by a p-type InP layer 38 doped to $5\times10^{17}$ cm$^{-3}$ and about 1.5 µm thick, which is capped by a 0.2 µm thick unstrained InGaAs layer 39 for contacting. A transverse waveguide is fabricated in the structure by conventional means, either in the form of a ridge (not shown) etched to the bottom of the upper InP layer or deeper as required for sufficient optical confinement, or in the form of a buried heterostructure (not shown) in which semi-insulating material, eg Fe-doped InP, is regrown around a deep etched ridge (not shown).

The material outside the ridge region is insulated by a layer of SiO$_2$ or similar material (not shown). Metal contacts 40 are applied by conventional means to the upper and lower surfaces. To decrease electrical capacitance, the upper contact is patterned to provide a pad of reduced area, to which an external lead (not shown) can be bonded. The device is cleaved to a length of around 160 µm, or as required for suitable attenuation in the "off" condition, and the lower surface of the chip is bonded to a suitable conducting mount (not shown). Input and output optical fibres (not shown) are aligned to the transverse waveguide to launch and collect the light. The device is operated as a modulator with a reverse bias from bias means 41 in the approximate range 2–5 V and a voltage swing of 2–4 V.

We claim:

1. An electro-absorption optical modulator having a substrate of a first composition material supporting a set of epitaxially grown layers defining a p-i-n architecture that includes a multiquantum well structure comprising a plurality of quantum well layers of a second composition material, which quantum well layers are interleaved with barrier layers of a third composition material, wherein the barrier layers are thick enough to preclude any substantial band structure interaction between adjacent quantum well layers, and wherein the third composition material has a smaller unstrained lattice constant than that of the first composition material, whereby the barrier layers are put in tensile strain.

2. An electro-absorption modulator as claimed in claim 1, wherein the second composition material has a larger unstrained lattice constant than that of the first composition material, whereby the quantum well layers are put in compressive strain.

3. An electro-absorption modulator as claimed in claim 2, wherein the lattice constant of the first composition material exceeds that of the third composition material by an amount that puts the barrier layers in tensile strain of at least 0.5%.

4. An electro-absorption modulator as claimed in claim 3, wherein the lattice constant of the first composition material exceeds that of the third composition material by an amount that puts the barrier layers in tensile strain of at least 0.8%.

5. An electro-absorption modulator as claimed in claim 3, which modulator includes reverse biasing means adapted to apply a reverse bias across the p-i-n architecture of the layers supported by the substrate.

6. An electro-absorption modulator as claimed in claim 3, wherein the substrate is made of InP and the quantum well layers are made of $In_{1-x}Ga_xAs_yP_{1-y}$.

7. An electro-absorption modulator as claimed in claim 6, which modulator includes reverse biasing means adapted to apply a reverse bias across the p-i-n architecture of the layers supported by the substrate.

8. An electro-absorption modulator as claimed in claim 1, wherein the lattice constant of the first composition material exceeds that of the third composition material by an amount that puts the barrier layers in tensile strain of at least 0.5%.

9. An electro-absorption modulator as claimed in claim 8, wherein the lattice constant of the first composition material exceeds that of the third composition material an amount that puts the barrier layers in tensile strain of at least 0.8%.

10. An electro-absorption modulator as claimed in claim 8, which modulator includes reverse biasing means adapted to apply a reverse bias across the p-i-n architecture of the layers supported by the substrate.

11. An electro-absorption modulator as claimed in claim 8, wherein the substrate is made of InP and the quantum well layers are made of $In_{1-x}Ga_xAs_yP_{1-y}$.

12. An electro-absorption modulator as claimed in claim 11, which modulator includes reverse biasing means adapted to apply a reverse bias across the p-i-n architecture of the layers supported by the substrate.

* * * * *